(12) United States Patent
Tatsuta et al.

(10) Patent No.: US 6,726,102 B2
(45) Date of Patent: Apr. 27, 2004

(54) DATA RECORDING MEDIUM AND CODE READER

(75) Inventors: Seiji Tatsuta, Hino (JP); Akira Matsui, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/086,124

(22) Filed: Feb. 28, 2002

(65) Prior Publication Data

US 2002/0121549 A1 Sep. 5, 2002

(30) Foreign Application Priority Data

Mar. 5, 2001 (JP) ........................................ 2001-060371

(51) Int. Cl.[7] ................................................ G06K 7/08
(52) U.S. Cl. ........................ 235/449; 235/483; 235/484; 235/486
(58) Field of Search ................................ 235/483, 484, 235/486

(56) References Cited

U.S. PATENT DOCUMENTS

| | | | | |
|---|---|---|---|---|
| 5,105,073 A | * | 4/1992 | Kovach et al. | 235/482 |
| 5,189,292 A | * | 2/1993 | Batterman et al. | 235/456 |
| 5,304,787 A | * | 4/1994 | Wang | 235/462.09 |
| 5,454,054 A | * | 9/1995 | Iizuka | 235/456 |
| 5,552,593 A | * | 9/1996 | Biss | 235/494 |
| 5,719,886 A | | 2/1998 | Matsui | 371/40.1 |
| 5,835,615 A | * | 11/1998 | Lubow et al. | 101/401.2 |
| 5,866,895 A | | 2/1999 | Fukuda et al. | 235/494 |
| 5,896,403 A | | 4/1999 | Nagasaki | 371/37.1 |
| 5,898,709 A | | 4/1999 | Imade | 371/40.11 |
| 6,170,750 B1 | | 1/2001 | Ueno | |
| 6,186,405 B1 | * | 2/2001 | Yoshioka | 235/494 |

FOREIGN PATENT DOCUMENTS

| | | |
|---|---|---|
| JP | 11-39417 A | 2/1999 |
| JP | 11-39418 A | 2/1999 |
| JP | 11-334253 A | 12/1999 |

* cited by examiner

Primary Examiner—Michael G. Lee
Assistant Examiner—Kimberly Nguyen
(74) Attorney, Agent, or Firm—Frishauf, Holtz, Goodman & Chick, P.C.

(57) ABSTRACT

A card records data as an optically readable code. A non-interference area is provided around the code to inhibit presence of only an interference image having an attribute causing an error during reading of the code. The code reader's CPU provides a code detection area to be used when a restoration section detects a code image from an image pickup area as a frame image stored in memory. This code detection area is determined based on an alignment error between the image pickup element and the code, and a specification of the code. The alignment error may result from the bottom of a slit which specifies a positional relationship between the code and the image pickup element to pick up the code.

3 Claims, 8 Drawing Sheets

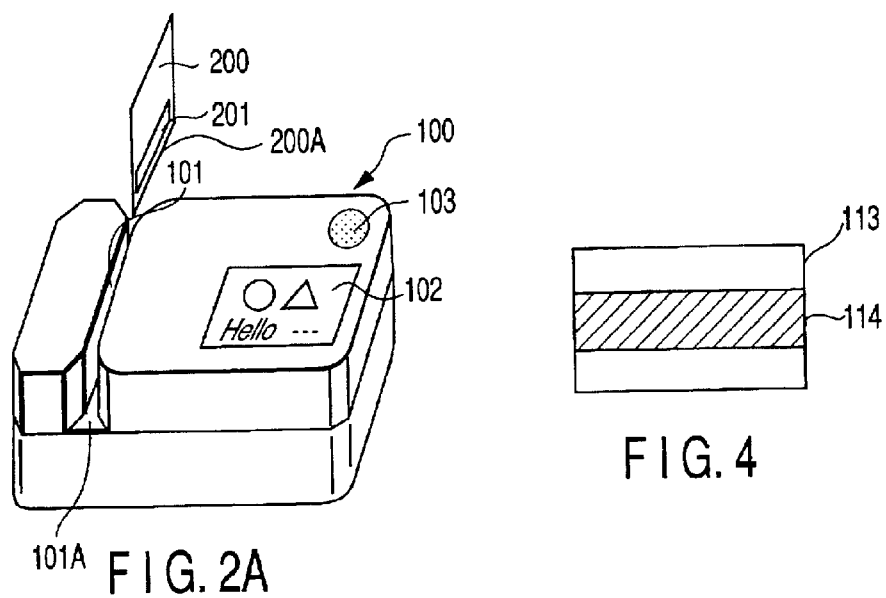
F I G. 2A
F I G. 4
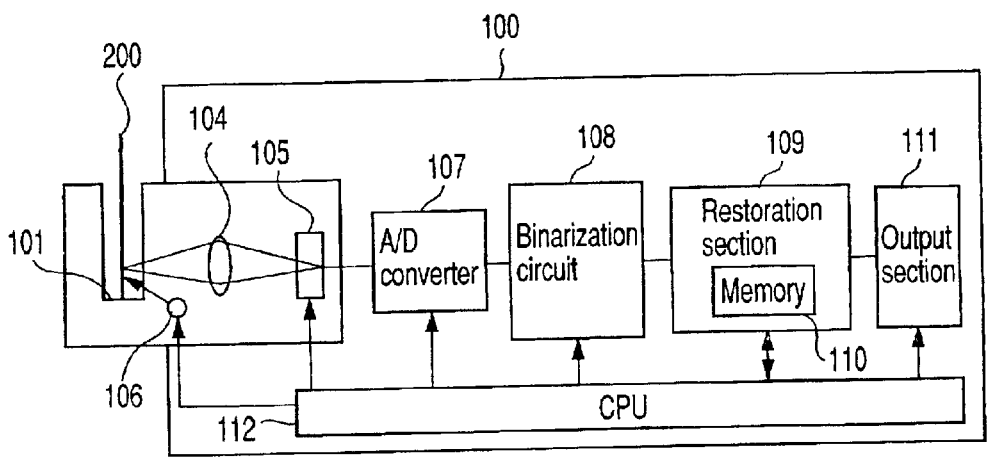
F I G. 2B
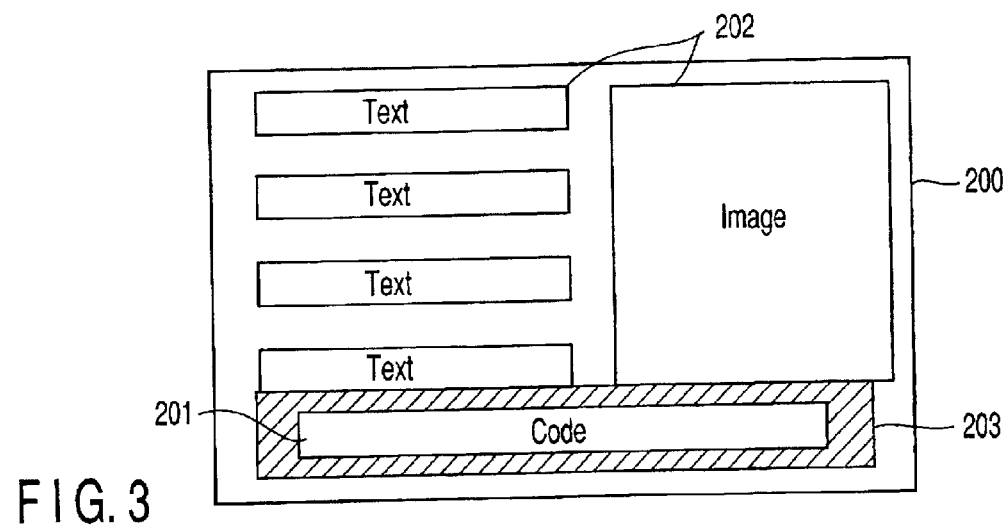
F I G. 3

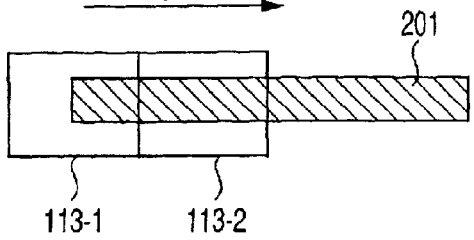
FIG. 18A
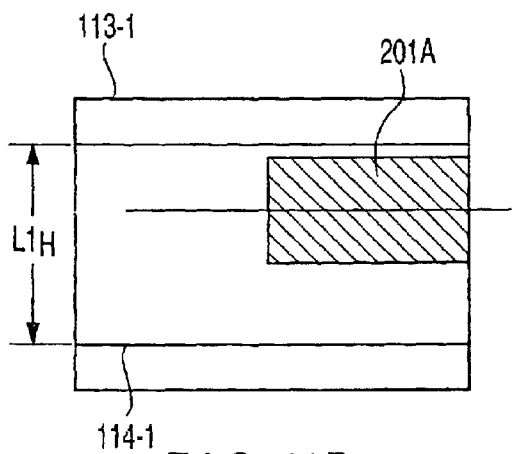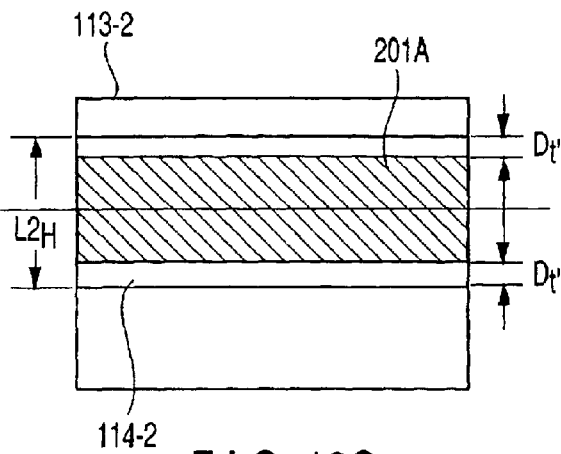
FIG. 18B  FIG. 18C
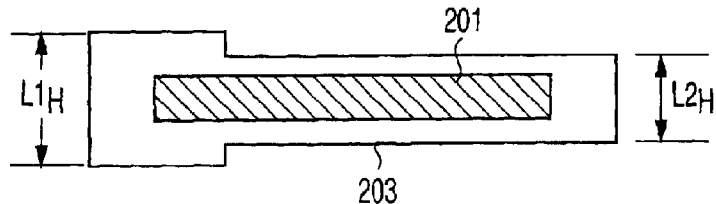
FIG. 19

DATA RECORDING MEDIUM AND CODE READER

CROSS-REFERENCE TO RELATED APPLICATIONS

This application is based upon and claims the benefit of priority from the prior Japanese Patent Application No. 2001-060371, filed Mar. 5, 2001, the entire contents of which are incorporated herein by reference.

BACKGROUND OF THE INVENTION

1. Field of the Invention

The present invention relates to a data recording medium for recording data as an optically readable code and a code reader for reading that code from the data recording medium.

2. Description of the Related Art

Conventionally, a variety of computer processable information such as voice, image, text, etc. is recorded on a medium, such as paper, in the form of optically readable codes, such as one- or two-dimensional barcodes. This technology is described in U.S. Pat. Nos. 5,896,403, 5,866,895, etc.

FIG. 1 shows a physical format configuration for a dot code disclosed in these publications.

This dot code 1 comprises a plurality of blocks adjacently arranged in a two-dimensional manner. Each block 2 contains a data area 3 in which black and white dot images are provided in a specified two-dimensional array. Data including voice etc., to be recorded is divided into blocks, each of which is represented as a black dot or a white dot corresponding to values "1" or "0" of a block of data. It should be noted that a white dot in FIG. 1 is equivalent to the color of the recording medium itself. Further, each block 2 includes a marker area, a pattern dot 6, and a block address pattern (block ID area) 7. The marker area contains a marker 5 which comprises a specified number of sequential black dots and is placed at the four corners of each block used for finding a reading reference point to read each dot (data dot 4) in the data area 3. The pattern dot 6 is a set of independent dots placed between markers 5 and is used for more accurately finding the reading reference point. The block address pattern 7 contains an error detection or correction code and is also placed between markers 5 for identifying each block 2. The marker 5 and the pattern dot 6 are surrounded by a completely white no-dot area 8 for easily detecting them.

There may be a case where the whole dot code 1 is larger than the visual field 9 of the reader, in other words, the dot code 1 cannot be picked up with a one-shot operation. Even in this case, the dot code 1 makes it possible to reconstruct the whole original data by collecting data contained in each block 2. For this purpose, an address given to each block 2 should be detected together with data dots 4 contained in the block on a block basis. This also enables recording of large amounts of data, such as voice, on the paper and easily reading that data by manual scanning.

For example, Jpn. Pat. Appln. KOKAI Publication Nos. 11-039417, 11-039418, etc. disclose a reader for reading such an optically readable code as the dot code 1 from a recording medium which records that code. According to this reader, the above-mentioned code is recorded along a specified side of a recording medium. This side thereof is touched to a slit-shaped guide groove. The code is read by manually moving the recording medium in the groove along that side.

In the reader that reads the code by manually scanning the recording medium whose specified side touches the slit-shaped guide groove, the recording position of the code on the recording medium along that specified side itself is defined on the basis of that specified side. An image pickup section is arranged so as to provide an image pickup area corresponding to that specified position. In this case, the image pickup area is designed to be larger than the code width so that the code can be read reliably. This aims at offsetting a recording position error for the code or a blur during the manual scanning. When the image pickup area is configured to be larger than the code width, however, the reader may incorrectly recognize an image other than the code (hereafter referred to as a peripheral image) captured in the image pickup area. As a countermeasure against this peripheral image, a possible solution may be to arrange the code sufficiently far from the peripheral image. This can prevent a block containing effective data and the peripheral image from being picked up simultaneously, and eliminate data read errors caused by these peripheral images.

However, a recording surface cannot be used effectively simply by arranging the code far from the peripheral image so that they are not picked up simultaneously. For example, recording a single code requires a large amount of space around that code. This degrades the recording density and greatly restricts the recording surface layout.

Even if the image pickup area contains only the code, an actually picked up image incorporates many redundant elements other than the code when the code is detected from that image. It would therefore take a long time to detect the code, delaying the code-reading operation.

The above-mentioned problems occur not only in manual scanning of a recording medium, but also in mechanical scanning. Further, the same problems also concern a pen-type reader as disclosed in, e.g., U.S. Pat. No. 6,170,750 B1 and Jpn. Pat. Appln. KOKAI Publication No. 11-334253. This pen-type reader is used for manual scanning of codes on a recording medium by placing the reader on a guide.

BRIEF SUMMARY OF THE INVENTION

The present invention has been made in consideration of the foregoing. It is therefore an object of the present invention to provide a data recording medium and a code reader capable of decreasing restrictions on the layout, effectively using the recording surface, and speeding up the read operation.

According to a first aspect of the present invention, there is provided a code reader to read a code from a data recording medium which records data as an optically readable code and is provided with a non-interference area around the code to prevent presence of only an interference image having an attribute causing an error during reading of the code, the code reader comprising:

an image pickup section to pick up the code;

a guide section configured to specify positional relationship between the image pickup section and the code;

a code detection section to set a code detection area in an image pickup screen obtained in the image pickup section and detect at least part of the code from the inside thereof; and a restoration section to specify the code from the image pickup screen based on a detection position of at least part of the code detected in the code detection section and restore data recorded in the code, wherein the code detection area is determined based on an alignment error between the image pickup section and the code due to the guide section and a specification of the code.

According to a second aspect of the present invention, there is provided a code reader to read the code from a data recording medium which records data as an optically readable code, comprising:

an image pickup section to pick up a code;

an image detection section to detect a specified image from an image pickup screen obtained in the image pickup section, the specified image being provided near the code on a data recording medium and being positioned according to a specified positional relationship with the code; and a restoration section to specify the code from the image pickup screen based on a detection position of the specified image detected in the image detection section and to restore data recorded in the code.

According to a third aspect of the present invention, there is provided a data recording medium comprising:

a portion where data is recorded as an optically readable code; and a non-interference area which is provided around the code and prevents presence of only an interference image having an attribute causing an error during reading of the code, wherein the recording medium stores the code read by a code reader having an image pickup section to pick up a code, a code detection section to set a code detection area in an image pickup screen obtained in the image pickup section and detect part of the code from the inside thereof, a restoration section to specify the code from the image pickup screen based on a detection position of part of the code detected in the code detection section and restore data recorded in the code, and a guide section configured to specify positional relationship between the image pickup section and the code, and the non-interference area is determined based on the code detection area, an alignment error between the image pickup section and the code due to the guide section, and a specification of the code.

According to a fourth aspect of the present invention, there is provided a data recording medium comprising:

a portion where data is recorded as an optically readable code; and the other portion, wherein the recording medium stores the code read by a code reader having an image pickup section to pick up a code, an image detection section to detect a specified image from an image pickup screen obtained in the image pickup section, and a restoration section to specify the code from the image pickup screen based on a detection position of the specified image detected in the image detection section and to restore data recorded in the code, and the specified image is provided near the code on a data recording medium and is positioned according to a specified positional relationship with the code.

According to a fifth aspect of the present invention, there is provided a card-shaped data recording medium comprising:

a portion which records visually readable images such as a character, symbol, figure, pattern, photo, etc.; and a portion which records data as an optically readable code along a given cut side, wherein a non-interference area is provided around the code to inhibit presence of only an interference image, out of the visually readable images, having an attribute causing an error during reading of the code, and the non-interference area contains a longer width between the code and the cut side than a width between the code and the visually readable image arranged adjacently to the code.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention and, together with the general description given above and the detailed description of the embodiments given below, serve to explain the principles of the invention.

FIG. 2A is a perspective view of a code reader according to a first embodiment of the present invention;

FIG. 2B is a block diagram of the code reader according to the first embodiment;

FIG. 3 shows a card as a data recording medium according to the first embodiment;

FIG. 4 shows an image pickup area and a code detection area;

FIG. 18A illustrates first and second image pickup areas;

FIG. 18B shows a code image picked up in the first image pickup area;

FIG. 18C shows a code image picked up in the second image pickup area;

FIG. 19 illustrates the size of a non-interference area on the data recording medium according to a fourth embodiment;

DETAILED DESCRIPTION OF THE INVENTION

Figure 1:
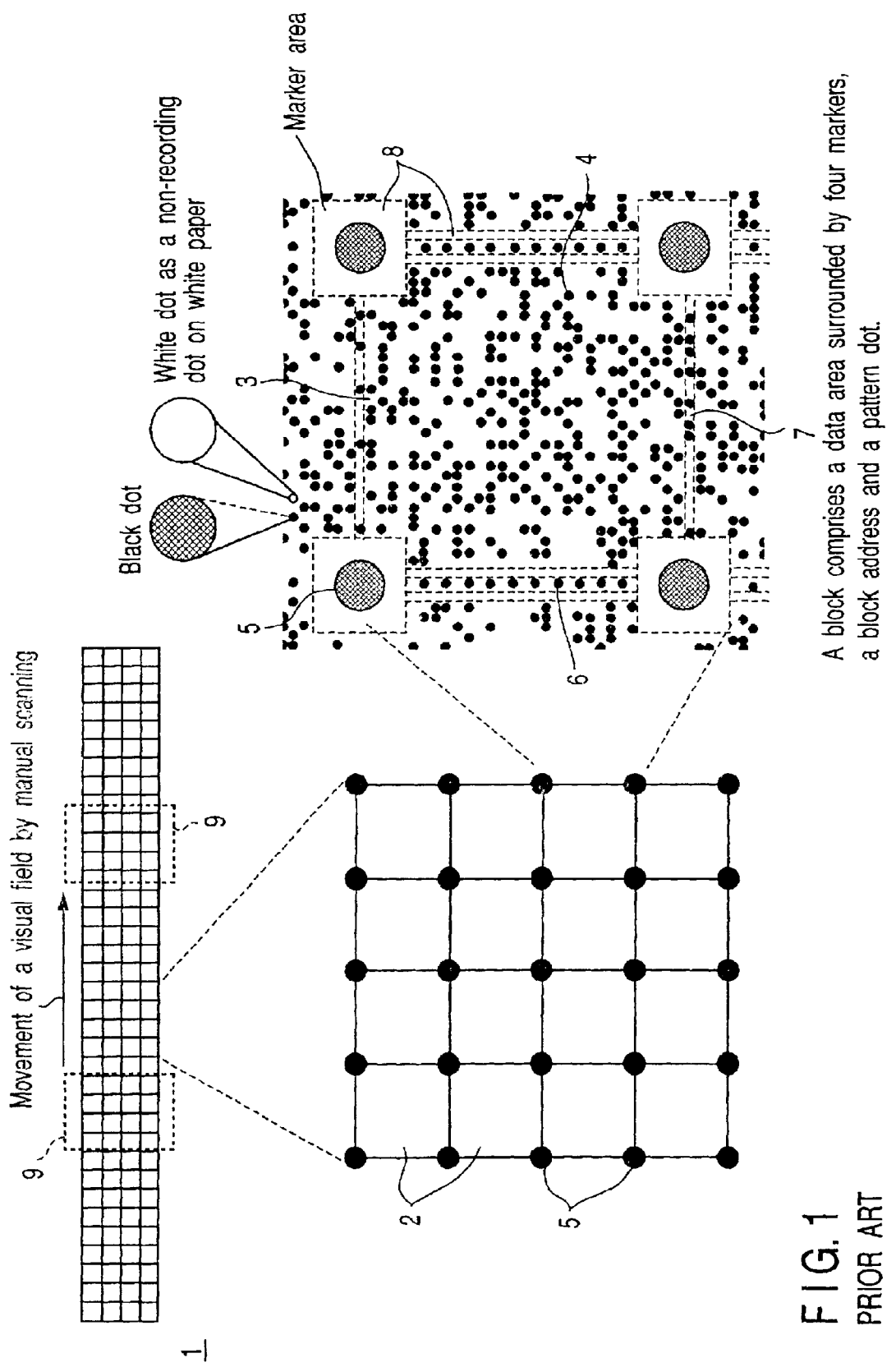
FIG. 1 shows a physical format configuration a dot code.

Embodiments of the present invention will now be described in further detail with reference to the accompanying drawings.

[First Embodiment]

FIGS. 2A and 2B are a perspective view and a block diagram of a code reader 100 according to the first embodiment of the present invention.

The code reader 100 according to this embodiment reads an optically readable code 201 recorded along a specified side of a card 200, a recording medium, as follows. The specified side of the card is inserted into a slit 101 functioning as a scanning guide. The card 200 is placed in the slit so that a recording medium positioning section 200A containing the above-mentioned specified side of the card 200 touches the scanning guide bottom, i.e., a guide positioning section 101A. The card 200 is then manually moved in the direction of the specified side.

As shown in FIG. 3, the card 200 contains the optically readable code 201 generated by processing various data such as text, voice, image, etc. and visually readable images as interference images 202. The visually readable images include characters (text), symbols, figures, patterns, photos, etc. and have attributes which may cause errors to reading the code.

The code reader 100 reads or picks up the code 201 by a pickup means via an aperture (not shown) arranged in the slit. The reader then processes the read image data to reproduce original multimedia data recorded as the code 201 and outputs it from a display section 102 such as an LCD and a speaker 103.

The image pickup means for picking up the code is provided adjacent to the slit 101 as a scanning guide and comprises an imaging lens 104, an image pickup element (CCD) 105, and a light source 106 for illuminating the code 201. A code image picked up by the image pickup element 105 is analog-digital converted in an A/D converter 107, and then is binarized in a binarization circuit 108. The binarized image is stored in memory 110 arranged in a restoration section 109. The restoration section 109 detects the code from the binarized image including the code stored in the memory 110 and restores the coded data to the original multimedia data. The restored multimedia data is output from an output section 111 comprising the display section 102 and the speaker 103. A CPU 112 as a control means controls the image pickup element 105, the light source 106, the A/D converter 107, the binarization circuit 108, the restoration section 109, the memory 110, and the output section 111.

As shown in FIG. 4, the binarized image stored in the memory 110 corresponds to an entire image in the image pickup area (image pickup screen) 113 picked up by the image pickup element 105 equivalent to the above-mentioned visual field 9. The CPU 112 sets a code detection area 114 (to be described later in detail) in the image pickup area 113 and extracts at least part of the code from the inside of the code detection area 114. It is possible to specify a code position on the screen if at least part of the code can be detected. Accordingly, the entire code does not necessarily need to be placed in the code detection area 114. The restoration section 109 locates the code in the image pickup area based on the detected code position and restores data recorded in the code.

This configuration uses a CCD as the image pickup element 105. When the configuration uses an XY address sensor, such as a CMOS sensor capable of two-dimensional reading, the necessary areas can be read from the sensor. In such case, the CPU 112 can set the code detection area 114 on the sensor, eliminating the need for temporarily storing the entire image in the memory 110 from the image pickup area 113.

The following describes how to set the code detection area 114 in detail.

Figure 5:
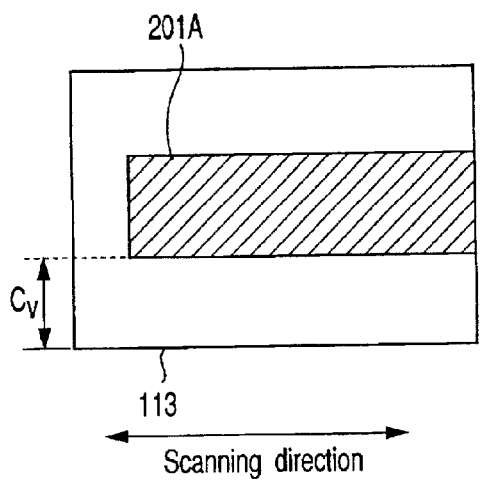
FIG. 5 shows a code image in the image pickup area when the code is picked up ideally.
Figure 6:
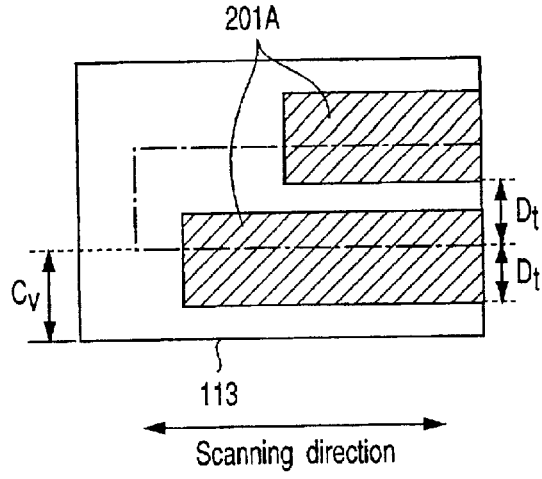
FIG. 6 shows a code image when the code is picked up with the maximum deviation.

As mentioned above, the code 201 is recorded on the card 200 as a recording medium. The recording position of the code 201 is predetermined with reference to the recording medium positioning section 200A including a side of the card which touches the bottom of the slit 101 as a scanning guide. A reading section of the code reader 100 is positioned accordingly. Ideally, as shown in FIG. 5, a code image 201A should be picked up at a position with a specified distance $C_V$ from the bottom of the image pickup area 113. Actually, as shown in FIG. 6, the code image is supposed to be picked up with the maximum deviation of $\pm D_t$ from the distance $C_V$. This deviation occurs due to an alignment error of the position for reading the card 200. The alignment error is caused by a recording position error (or an error of cutting the card) against the recording medium positioning section 200A, an assembly error of the image pickup element 105 against the guide positioning section 101A, a contact error between the recording medium positioning section 200A and the guide positioning section 101A, etc.

Figure 7:
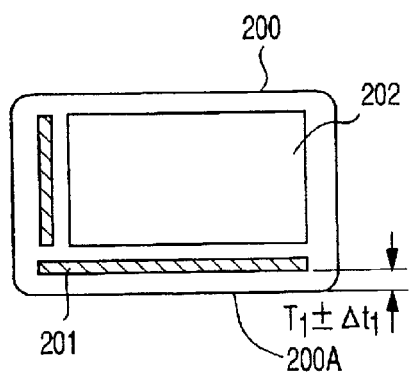
FIG. 7 illustrates a recording position error of the code with reference to a recording medium positioning section.

As shown in FIG. 7, distance $T_1$ is specified from the cutting surface of the card 200 to a position where the code 201 is actually arranged. Actually, that distance deviates $\pm \Delta t_1$ due to a cutting error. This $\pm \Delta t_1$ corresponds to a recording position error for the code against the aforementioned recording medium positioning section 200A.

Figure 8:
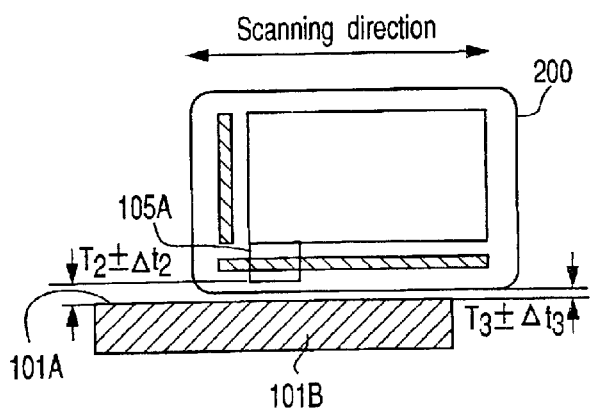
FIG. 8 illustrates an assembly error of the image pickup section against a guide positioning section and a contact error between the recording medium positioning section and the guide positioning section.

As shown in FIG. 8, the image pickup element 105 is assembled so that its visual field 105A corresponding to the image pickup area 113 is positioned with a specified distance $T_2$ from an edge of the card 200 or from the bottom of the slit 101 where the recording medium positioning section 200A is touched for scanning, i.e., from the guide positioning section 101A. Actually, the image pickup element 105 is assembled with an error. It should be noted that the edge of the card 200 is equivalent to. Namely, a relative assembly error $\pm \Delta t_2$ between the image pickup element 105 and the scanning guide 101B corresponds to an assembly error of the image pickup element 105 against the aforementioned contact surface.

Further, as shown in FIG. 8, gap $T_3$ is specified for manual scanning by letting the recording medium positioning section 200A of the card 200 touch the scanning guide 101B. Normally, gap $T_3$ is 0 because the scanning requires contact between the edge of the card 200 and the scanning guide 101B. For example, however, the edge of the card 200 may deviate from the scanning guide 101B. Error $\Delta t_3$ due to this deviation corresponds to a contact error between the guide positioning section 101A and the recording medium positioning section 200A. Normally, this error is $+\Delta t_3$ because the card 200 may be only lifted. When the card 200 is self-propelled, however, the error becomes $\pm\Delta t_3$ due to mechanical looseness.

The position for picking up the code causes errors $\Delta t_1$, $\Delta t_2$, and $\Delta t_3$. The maximum deviation of $D_t$ is the sum of $\Delta t_1$, $\Delta t_2$, and $\Delta t_3$:

$$D_t = \Delta t_1 + \Delta t_2 + \Delta t_3$$

When all the errors $\Delta t_1$, $\Delta t_2$, and $\Delta t_3$ are 0s in an ideal state, the code image 201A is picked up as shown in FIG. 5. When all the errors $\Delta t_1$, $\Delta t_2$, and $\Delta t_3$ occur with negative values, the code image 201A is picked up with the maximum deviation $D_t$ toward the bottom as shown in FIG. 6. When all the errors $\Delta t_1$, $\Delta t_2$, and $\Delta t_3$ occur with positive values, the code image 201A is picked up with the maximum deviation $D_t$ toward the top. Accordingly, the image pickup area 113 needs to be size so that the code image 201A can be picked up reliably in any case. The imaging lens 104 and the image pickup element 105 are configured so as to satisfy this condition.

Conventionally, the code is detected from the entire image pickup area 113 having this size. Processing to detect the code is needed for a portion where the code image 201A is unavailable, consuming an extra amount of processing time and memory.

A non-interference area 203 (see FIG. 3) is provided to prevent recording of the interference image 202 around the code 201 recorded on the card 200 as a data recording medium because the interference image 202 affects reading of the code. The layout is designed so that the interference image 202 can be recorded on the card 200 outside the non-interference area 203. Conventionally, the code is detected from the entire image pickup area 113. Even if the code image 201A is captured with a deviation as shown in FIG. 6, the interference image 202 must be picked up outside the image pickup area 113. For this purpose, the sufficiently wide non-interference area 203 must be provided on and under the code 201. This necessitates a large, wasteful blank area and places restrictions on the layout.

Figure 9:
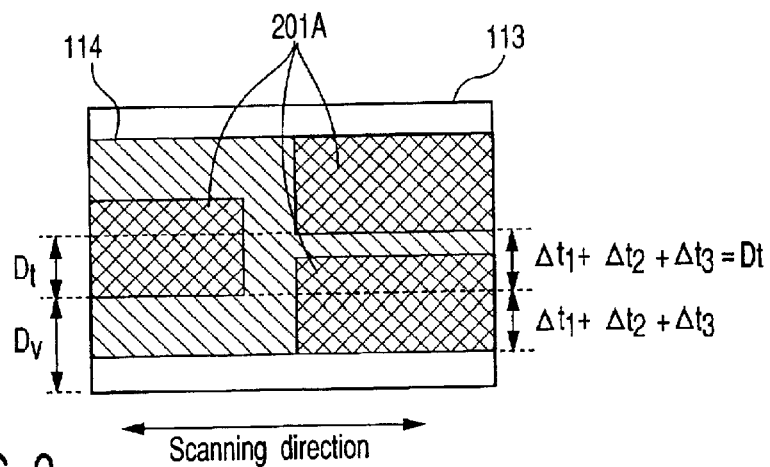
FIG. 9 shows how to set a code detection area according to the first embodiment.

As shown in FIG. 9, this embodiment allows the CPU 112 to provide the code detection area 114 inside the image pickup area 113.

The code detection area 114 is designed so that it can include the entire code image 201A even with the maximum deviation. As mentioned above, the code position can be specified from part of the code. It may be preferable to configure the code detection area 114 so that part of the code to be detected can be reliably detected even with the maximum deviation.

Consequently, the restoration section 109 can process only the code detection area 114 for detecting the code. Processing a minimum area in the image pickup area 113 saves memory and speeds up the processing.

Figure 10:
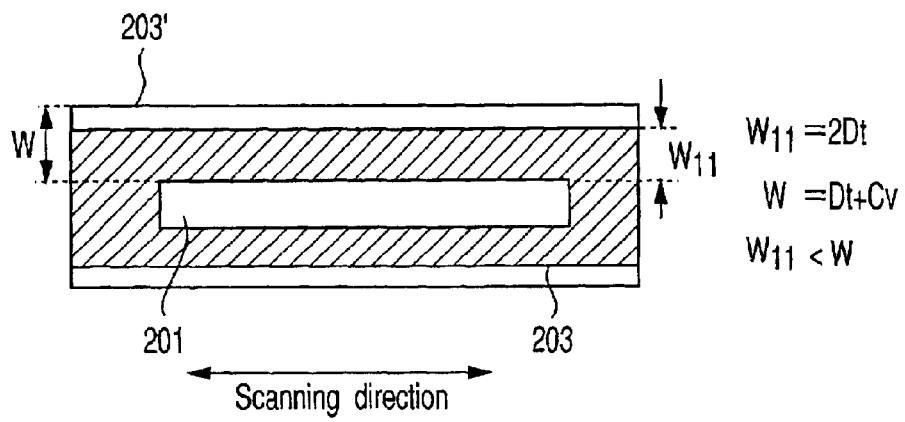
FIG. 10 illustrates the size of a non-interference area on the data recording medium according to the first embodiment.

As shown in FIG. 10, the non-interference area 203 is provided around the code 201 on the card 200 as a data recording medium the code reader 100 reads by using the code detection area 114.

Namely, the non-interference area 203 is provided with width $W_{11}$ on and under the code 201. This width prevents the interference image 202 from being taken in the code detection area 114 even if the code image 201A is picked up with the maximum deviation. The width is twice the above-mentioned deviation $D_t$:

$$W_{11} = 2D_t$$

When the code detection area 114 is not provided, the non-interference area 203' needs to have width W on and under the code 201 so as to exclude the interference image 202 between the top and the bottom of the image pickup area 113. Width W is found by adding the aforementioned deviation $D_t$ to distance $C_V$ between the ideally picked up code 201 and the bottom of the image pickup area 113:

$$W = D_t + C_V$$

Since Cv>Dt, $W_{11} < W$

Thus, by providing the code detection area 114, it is possible to decrease the size of the non-interference area 203 of the card 200 as a data recording medium, allowing the effective use of the recording surface.

The non-interference area 203 does not allow all visually readable images to be arranged. It is possible to arrange a non-interference image which does not affect code reading. For example, when the code reader 100 is configured to use a red LED as the above-mentioned light source 106 for reading, red image can not be detected, therefore, red visually readable images such as characters, symbols, etc. do not affect code reading. There is no problem in arranging such a red visually readable image (non-interference image) on the non-interference area 203. Alternatively, the code reader can use, e.g., the above-mentioned dot code 1 as the code 201 and detect the code by detecting the above-mentioned marker 5. On such a code reader, a visually readable image including a low reflectance portion almost as large as the marker 5 adversely affects code reading. In a visually readable image in which includes a low reflectance portion sufficiently smaller than the marker 5, the low reflectance portion is not detected as the marker 5 and the visually readable image is assumed to be a non-interference image. Thus, a non-interference image depends on what should be detected. No problem occurs even if such a non-interference image is arranged on the non-interference area 203.

[Second Embodiment]

The following describes the second embodiment of the present invention.

While the first embodiment has chiefly explained that the code detection area 114 is configured to entirely include the code 201, the second embodiment configures the code detection area 114 to partially include the code 201.

Figure 11:
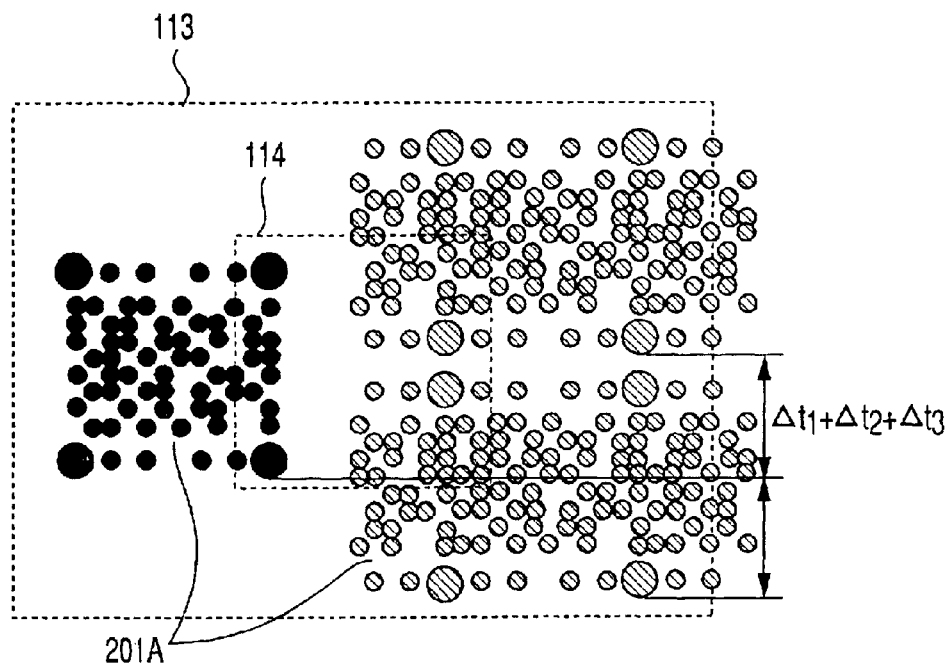
FIG. 11 illustrates deviation of a code image for the dot code.

For example, In case of using the aforementioned dot code 1 as the code 201, if the marker 5 can be detected it is possible to estimate which part of the image pickup area 113 contains an image for the dot code 1 based on the position of the detected marker 5 and known information relating to the dot code 1. When errors $\Delta t_1$, $\Delta t_2$, and $\Delta t_3$ occur as described in the first embodiment, the code image 201A deviates at its maximum in the image pickup area 113 as shown in FIG. 11. In the second embodiment, since it suffices to detect any one of markers 5 in the dot code 1, the code detection area 114 is configured to allow at least one marker 5 to be detected even when the effective block 2 is contained anywhere in the image pickup area 113.

When the code detection area 114 is configured as mentioned above, the following shows how the non-interference area 203 is determined on the card 200 as a data recording medium.

Figure 12A:
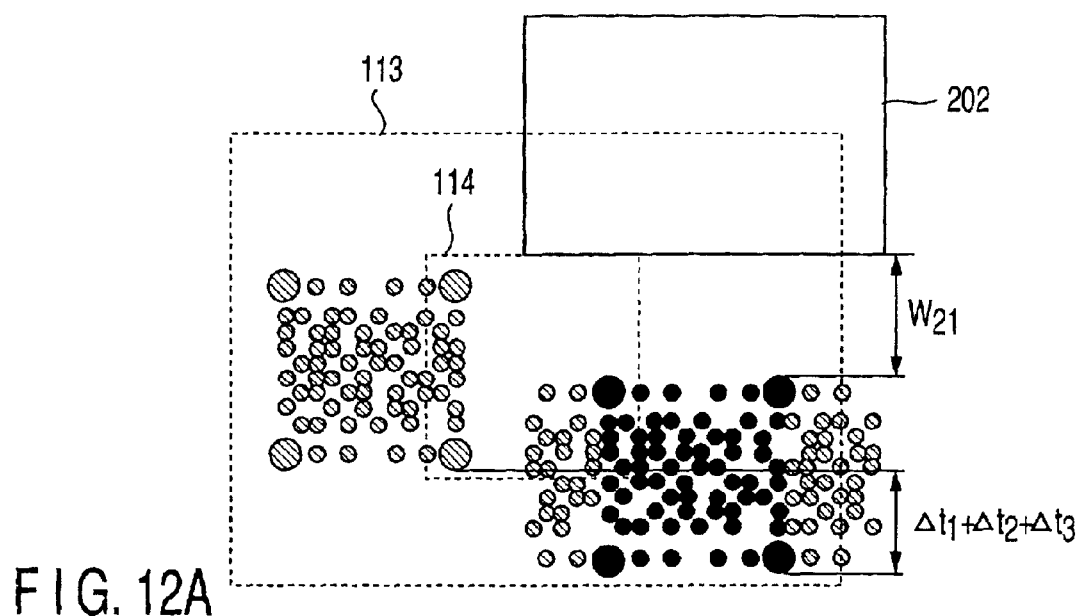
FIG. 12A shows the relationship between the code detection area for the code reader according to a second embodiment of the present invention and a code image picked up and shifted to the bottom of the image pickup area.

FIG. 12A shows that all the errors $\Delta t_1$, $\Delta t_2$, and $\Delta t_3$ occur with positive values, and the code image 201A is picked up at the top of the image pickup area 113. In this case, a blank area is needed for the width indicated by $W_{21}$ under the dot code 1 so that the code detection area 114 can exclude the adjacent interference image 202.

Figure 12B:
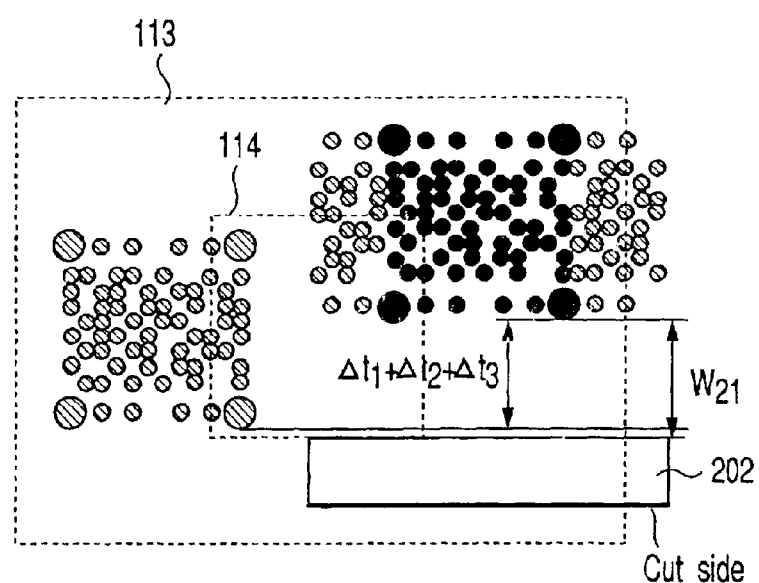
FIG. 12B shows the relationship between the code detection area for the same code reader and a code image picked up and shifted to the top of the image pickup area.

Adversely, FIG. 12B shows that all the errors $\Delta t_1$, $\Delta t_2$, and $\Delta t_3$ occur with negative values, and the code image 201A is picked up at the bottom of the image pickup area 113. In this case, a blank area is needed for the width indicated by $W_{21}$ on the dot code 1 so that the code detection area 114 can exclude the adjacent interference image 202.

Figure 13:
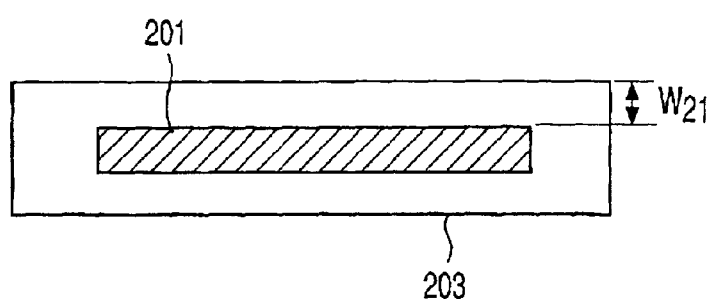
FIG. 13 illustrates the size of a non-interference area on the data recording medium according to the second embodiment.

At this time, the non-interference area 203 on the data recording medium side requires the width set to $W_{21}$ on and under the code 201 as shown in FIG. 13.

Figure 14:
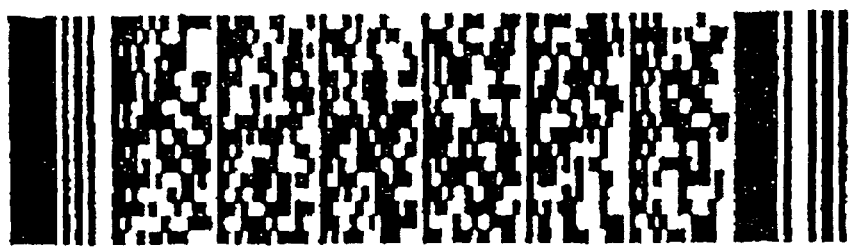
FIG. 14 shows a PDF417 code as an example of other codes.

For the dot code 1, the marker 5 identifies the code. For the other codes such as a PDF417 code as shown in FIG. 14, a corner or an edge identifies the code. For a QR code, a rectangular mark identifies the code. Therefore, the code detection area 114 is determined according to code specifications such as a code-identifying indication to be detected and a position thereof on the code.

This example does not yield $\Delta t_1+\Delta t_2+\Delta t_3=W_{21}$ because a large code detection area is provided for reliably detecting the marker. Without such a sufficient area, it is possible to satisfy $\Delta t_1+\Delta t_2+\Delta t_3=W_{21}$.

[Third Embodiment]

The third embodiment of the present invention is described with reference to FIGS. 15 through 17.

In the third embodiment, the restoration section 109 of the code reader 100 detects part of the code in a specified direction within the code detection area 114 which is configured according to the second embodiment. When that part of the code is detected, the code detection is terminated.

Figure 15:
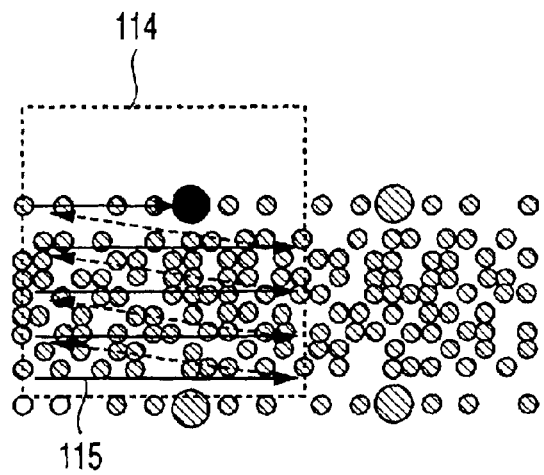
FIG. 15 shows how to detect a marker in the code detection area for the code reader according to the third embodiment of the present invention.
Figure 16:
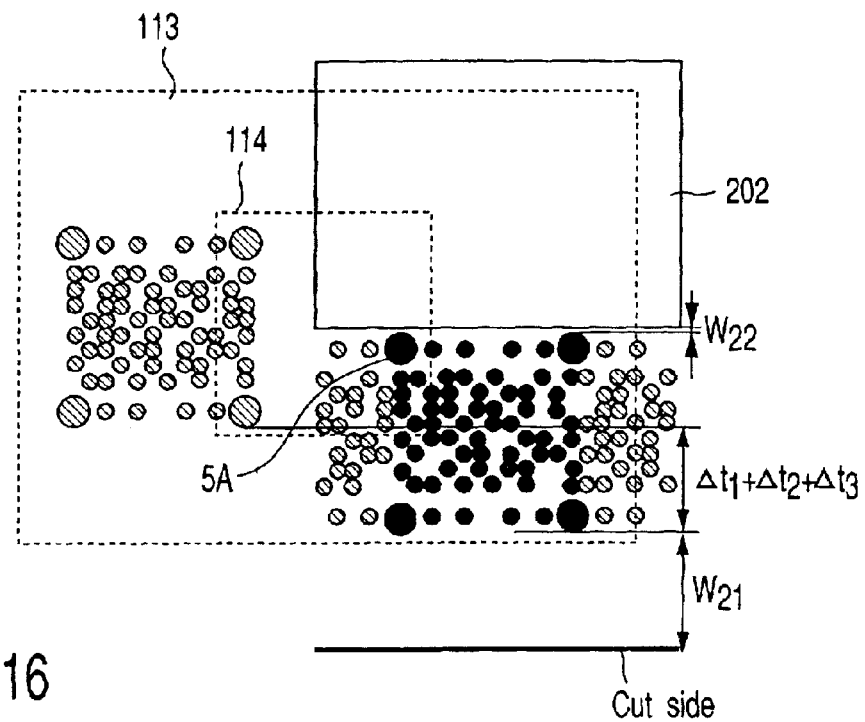
FIG. 16 shows the relationship between the code detection area and a code image picked up and shifted to the bottom of the image pickup area.

In the case of the dot code 1, for example, the marker 5 is detected in a marker detection direction 115 as indicated by a solid-line arrow in FIG. 15. When the marker 5 is detected, positions of the other markers can be identified according to the known information relating to the dot code 1. Thus, at this point, the code detection is terminated.

When the part of the code is detected, no attempt is made to detect the code in an area over that part in the code detection area 114. No problem occurs if the interference image 202 is picked up in that area. For example, as shown in FIG. 16, a code image is picked up with the deviation of $\Delta t_1+\Delta t_2+\Delta t_3$ downward in the image pickup area 113 and the interference image 202 enters the code detection area 114. In this state, the marker 5 is detected from the bottom of the code detection area 114. When the marker 5A is detected, the code detection terminates in the code detection area 114. The interference image 202 does not affect the code reading.

Figure 17:
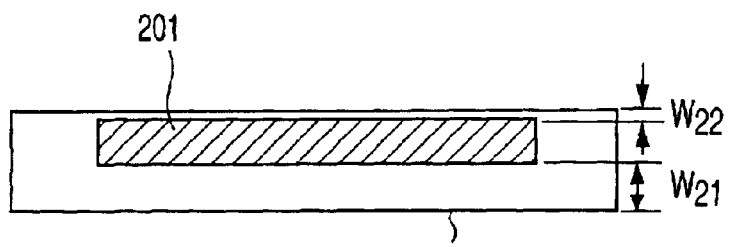
FIG. 17 illustrates the size of a non-interference area on the data recording medium according to the third embodiment.

Consequently, as shown in FIG. 17, it is possible to narrow width $W_{22}$ for the upper or lower side (or the right or left side) of the code 201 in the non-interference area 203 of the card 200 as a data recording medium. This width $W_{22}$ is provided to reliably detect the marker.

[Fourth Embodiment]

The fourth embodiment of the present invention is described with reference to FIGS. 18A through 19. When the code 201 is scanned as shown in FIG. 18A, an image pickup area picked up at the beginning of the scanning is defined as a first image pickup area 113-1. An image pickup area picked up thereafter is defined as a second image pickup area 113-2. The code image 201A is picked up in the first and second image pickup areas 113-1 and 113-2 as shown in FIGS. 18B and 18C. The example below is described by using $\Delta t_3$ sufficiently smaller than $\Delta t_1$ and $\Delta t_2$ in the above-mentioned example.

Generally, when the code 201 is scanned to perform a plurality of pickup operations, there is little deviation between the position of the code image 201A in the first image pickup area 113-1 and that in the second image pickup area 113-2. This is because a scanning guide 101A determines a pickup position of the code in the image pickup area 113.

In this embodiment, as shown in FIG. 18B, the CPU 112 sets a first code detection area 114-1 with width $L1_H$ in the first image pickup area 113-1, as in the aforementioned first embodiment. When part of the code is detected, as shown in FIG. 18C, the CPU 112 sets a second code detection area 114-2 in and after the second image pickup area 113-2 and detects the code only within this area. The second code detection area 114-2 is centered at the center axis of the code image 201A detected in the first code detection area 114-1 and has width $L2_H$ which is narrower than width $L1_H$ of the first code detection area 114-1.

When the code image 201A deviates upward as shown in FIG. 18B by recording position error $\Delta t_1$ of the code against the recording medium positioning section 200A, assembly error $\Delta t_2$ of the image pickup element 105 against the guide positioning section 101A, and contact error $\Delta t_3$ between the recording medium positioning section 200A and the guide positioning section 101A, the code is detected in the upper part of the first code detection area 114-1. At this point, an approximate size of $\Delta t_2$ can be specified. Accordingly, the second code detection area 114-2 is set in the second image pickup area 113-2. The second code detection area 114-2 has width $L2_H$ including width Dt' due to recording position error $\Delta t_1$ and contact error $\Delta t_3$ upward and downward from that code position during scanning.

This further narrows the code detection area 114 on the code reader 100, speeding up the processing and saving memory.

FIG. 19 shows the non-interference area 203 on the card 200 as a data recording medium when the code reader 100 is configured as mentioned above. Namely, the non-interference area 203 has width $L1_H$ at the beginning of scanning for the code 201 and has width $L2_H$ narrower than $L1_H$ in the other part. Consequently, the recording surface can be used more effectively.

[Fifth Embodiment]

The fifth embodiment of the present invention will now be described.

Figure 20:
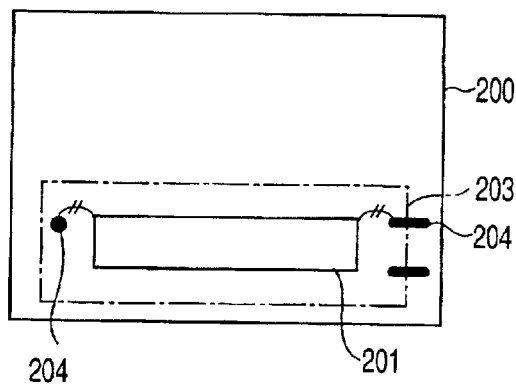
FIG. 20 shows the relationship between the non-interference area on the data recording medium according to a fifth embodiment and a known image.

As mentioned above, the non-interference area 203 cannot contain a visually readable image, which affects reading of the code 201. However, as shown in FIG. 20, it is also possible to arrange a black circle similar to the marker 5 or a bar image as a known image 204. In this case, the code reader 100 needs to previously identify the shape of the known image 204 and positional relationship between this known image 204 and the code 201.

When the known image 204 is recorded according to a specified positional relationship with the code 201, the code reader 100 detects the known image 204 from the code detection area 114 and can locate the code 201 based on the known positional relationship. Thus, the code 201 can be read easily.

When the relationship with the code 201 is known, the code 201 is read successfully even if the known image 204 is arranged in the non-interference area 203 near the code, and data can be reproduced reliably. It is possible to expand the possibility of card layout, e.g., by adding marks near the code and effectively use the recording surface.

Figure 21:
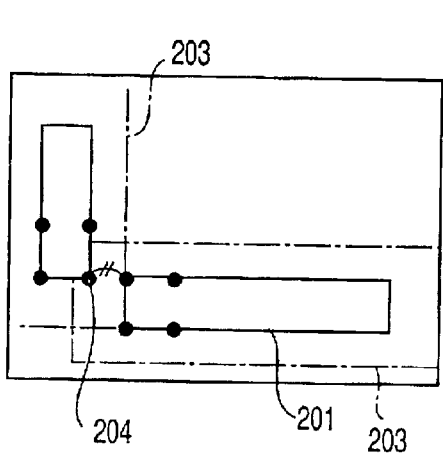
FIG. 21 shows a known image as part of other codes.

In this case, as shown in FIG. 21, the known image 204 can be part of the adjacent code, such as the marker 5.

This configuration allows the code 201 to be read successfully and arrange other codes nearby. Accordingly, the recording surface can be used effectively.

Figure 22:
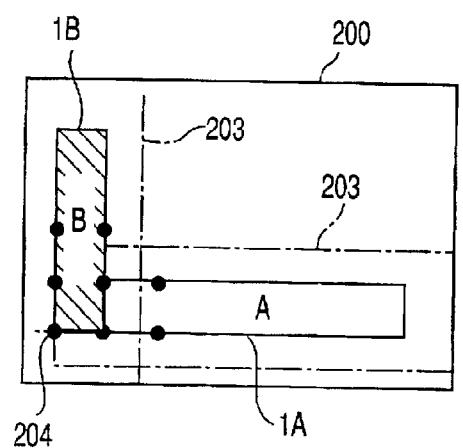
FIG. 22 shows two dot codes which use a marker both dot codes.

Further, as shown in FIG. 22, the dot code 1 can allow an adjacent dot code to also serve as the marker 5.

When a marker is detected as the known image 204, the block 2 containing that marker is not read during an attempt to read a dot code 1A. This is due to directionality of the blocks. Blocks may be separated by referring to their addresses. There is a known positional relationship between the marker as known image 204 and the dot code 1A. Namely, because the position of a marker pairing with that marker is identified, the position of the marker as the known image 204 uniquely determines the position of the dot code 1A. Therefore, the dot code 1A is correctly read if a marker is also used as the marker of an adjacent dot code. Obviously, there is no problem in reading a dot code 1B.

[Sixth Embodiment]

The sixth embodiment of the present invention will now be described.

The aforementioned first embodiment provides the same width $W_{11}$ on and under the code 201 in the non-interference area 203.

Generally, a plurality of cards are recorded at a time on a large sheet of paper and are cut into respective cards 200 as data recording media.

Figure 23:
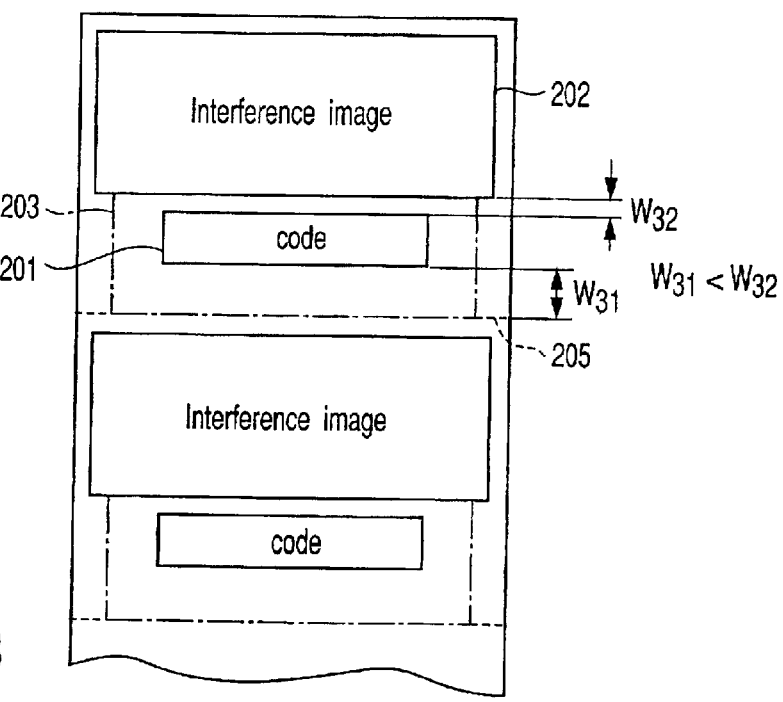
FIG. 23 illustrates the size of a non-interference area on the data recording medium according to a sixth embodiment.

As shown in FIG. 23, the code 201 is recorded along a given cut side 205 and the interference image 202 as a visually readable image is recorded adjacently to it. In this case, width $W_{31}$ between the code 201 and the cut side 205 should be set to be longer than width $W_{32}$ between the code 201 and the interference image 202.

Since the card is provided with a large blank area void of other images to be recorded on the cut side 205, a smaller blank area can be provided on the opposite side. This can not only expand the possibility of card design, but also prevent the code and a simultaneously recorded pattern from being cut due to a cut error.

For example, the aforementioned width $W_{31}$ can be determined based on recording position error $\Delta t_1$ of the code against the recording medium positioning section 200A, assembly error $\Delta t_2$ of the image pickup element 105 against the guide positioning section 101A, and contact error $\Delta t_3$ between the recording medium positioning section 200A and the guide positioning section 101A. Width $W_{32}$ on the uncut side can be determined based on errors $\Delta t_2$ and $\Delta t_3$ except error $\Delta t_1$.

The non-interference area 203 having a large blank area on the cut side 205 is also applicable to the embodiments other than the first embodiment.

While there have been described specific preferred embodiments of the present invention, it is to be distinctly understood that the present invention is not limited thereto but various changes and modifications may be made in the present invention without departing from the spirit and scope thereof.

While the above-mentioned embodiments have been described by using the example of manually scanning the recording medium by letting a given side thereof touch the slit-shaped guide groove, the present invention is also applicable to a case of mechanically scanning a self-propelled recording medium. Further, the present invention is similarly applicable to a case of manually scanning a code on a recording medium by placing a pen-type reader on a guide as disclosed in, e.g., U.S. Pat. No. 6,170,750 B1 and Jpn. Pat. Appln. KOKAI Publication No. 11-334253.

The gists of the present invention are as follows.

(1) A code reader to read a code from a data recording medium which records data as an optically readable code and is provided with a non-interference area around the code to prevent presence of only an interference image having an attribute causing an error during reading of the code, the code reader comprising:

an image pickup section to pick up the code;

a guide section configured to specify positional relationship between the image pickup section and the code;

a code detection section to set a code detection area in an image pickup screen obtained in the image pickup section and detect at least part of the code from the inside thereof; and a restoration section to specify the code from the image pickup screen based on a detection position of at least part of the code detected in the code detection section and restore data recorded in the code, wherein the code detection area is determined based on an alignment error between the image pickup section and the code due to the guide section and a specification of the code.

Namely, the guide section specifies a positional relationship between the image pickup section and the code. This makes it possible to provide a minimum code detection area from the image pickup screen based on an alignment error at this time and the code specification (displacement allowance of the code itself), providing an effect of speeding up processing and saving memory.

(2) The apparatus according to (1), wherein the guide section allows part thereof as a guide positioning section to touch a recording medium positioning section as part of the recording medium and determines a positional relationship between the image pickup section and the code.

Namely, the image pickup section can be easily positioned to the code by letting part of the guide section touch the data recording medium.

(3) The apparatus according to (2), wherein the guide section is a slit, and the data recording medium is shaped into a card, and inserting the card-shaped data recording medium into the slit determines positional relationship between the image pickup section and the code.

Namely, a combination of the slit and the card provides alignment and enables data to be reproduced reliably by preventing the card from lifting or slanting.

(4) The apparatus according to (2), wherein the alignment error is determined by a contact error between a guide section and a recording medium in the guide positioning section.

Namely, a minimum code detection area can be provided by estimating an alignment error based on an error resulting from a contact state between the guide section and the recording medium.

(5) The apparatus according to (2), wherein the alignment error is determined by an assembly error of the image pickup section against the guide positioning section.

Namely, a minimum code detection area can be provided by estimating an alignment error based on an assembly error of the image pickup section against the guide positioning section.

(6) The apparatus according to (2), wherein
the alignment error is determined by a recording position error of the code against the recording medium positioning section.

Namely, a minimum code detection area can be provided by estimating an alignment error based on a recording position error of the code against the recording medium positioning section.

(7) The apparatus according to (1), wherein
the non-interference area is widened on an upper or lower side (or right or left side) of the code, and
the code detection section starts detection from the wider side of the non-interference area and terminates detection when detecting part of the code.

Namely, there is a possibility of code detection around the code on a side where the code detection section starts detection. When part of the code is detected, the detection processing terminates. Accordingly, no code detection is performed around the code on a side where the detection advances. Data can be reproduced reliably even if the non-interference area is narrowed in the side where the detection advances.

(8) The apparatus according to (1), wherein
the code comprises a plurality of blocks,
each of the blocks comprises an arrangement of a data area containing data divided from the data, a marker area containing a marker for identifying that block, and a block ID area containing block ID information for independently identifying that block, according to a specified positional relationship,
at least part of the code detected in the code detection section is the marker, and
the restoration section specifies the code from the image pickup screen in units of blocks and restores the divided data.

Namely, the code is divided into blocks and is recorded in units of blocks. The reader performs a read operation in units of blocks. Data can be reproduced reliably even if the code contains too large an amount of data to fit in a single image pickup screen.

(9) The apparatus according to (8), wherein
the code is read by means of relative scanning with reference to the image pickup section,
the non-interference area is narrowed in a portion other than an edge used to start scanning the code, and
the code detection section provides a narrower code detection area used to detect the latter part of the code than a code detection area used to detect the beginning of the code during the scanning.

Once part of the code is detected in the code detection section, the code detection area can be narrowed because the guide section specifies a code pickup position in the image pickup screen during later detection processing. Accordingly, data is reliably reproduced even if the non-interference area is narrowed in portion other than that to start scanning the code.

(10) A code reader to read the code from a data recording medium which records data as an optically readable code, comprising:
an image pickup section to pick up a code;
an image detection section to detect a specified (known) image from an image pickup screen obtained in the image pickup section, the specified image being provided near the code on a data recording medium and being positioned according to a specified (known) positional relationship with the code; and
a restoration section to specify the code from the image pickup screen based on a detection position of the specified image detected in the image detection section and to restore data recorded in the code.

A specified image is recorded according to a specified positional relationship with the code. Accordingly, detecting that image in the image detection section can specify a position of the code based on the known positional relationship. It becomes possible to make code reading easy. When the positional relationship with the code is known, reading the code is not prevented even if a specified image is provided near the code, therefore, data can be reproduced reliably. It is possible to expand the possibility of card layout, e.g., by adding marks near the code and effectively use the recording surface.

(11) The apparatus according to (10), wherein
the specified image is part of an adjacent code.

Namely, it is possible to successfully read the code and arrange other codes nearby. Accordingly, the recording surface can be used effectively.

(12) A data recording medium comprising:
a portion where data is recorded as an optically readable code; and
a non-interference area which is provided around the code and prevents presence of only an interference image having an attribute causing an error during reading of the code, wherein
the recording medium stores the code read by a code reader having an image pickup section to pick up a code, a code detection section to set a code detection area in an image pickup screen obtained in the image pickup section and detect part of the code from the inside thereof, a restoration section to specify the code from the image pickup screen based on a detection position of part of the code detected in the code detection section and restore data recorded in the code, and a guide section configured to specify positional relationship between the image pickup section and the code, and
the non-interference area is determined based on the code detection area, an alignment error between the image pickup section and the code due to the guide section, and a specification of the code.

Namely, the guide section specifies a positional relationship between the image pickup section and the code. This makes it possible to provide a minimum non-interference area based on an alignment error at this time, the code specification (displacement allowance of the code itself), and the code detection area, and to reliably reproduce data without preventing the code from being read due to interference of images around the code to be read. Except an interference image, a picture or a character can be freely arranged near the code, enabling the effective use of the recording surface.

(13) The medium according to (12), wherein
the data recording medium allows part thereof as a recording medium positioning section to touch a guide positioning section as part of the guide section and determines positional relationship between the image pickup section and the code.

Namely, the image pickup section can be easily positioned to the code by letting part of the data recording medium touch the guide section.

(14) The medium according to (13), wherein
the guide section is a slit, and
the data recording medium is shaped into a card, and inserting the card-shaped data recording medium into the slit determines positional relationship between the image pickup section and the code.

Namely, a combination of the slit and the card provides alignment and enables data to be reproduced reliably by preventing the card from lifting or slanting.

(15) The medium according to (13), wherein the alignment error is determined by a contact error between a recording medium and a guide section in the recording medium positioning section.

Namely, a minimum non-interference area can be provided by estimating an alignment error based on an error resulting from a contact state between the guide section and the recording medium.

(16) The medium according to (13), wherein the alignment error is determined by an assembly error of the image pickup section against the guide positioning section.

Namely, a minimum non-interference area can be provided by estimating an alignment error based on an assembly error of the image pickup section against the guide positioning section.

(17) The medium according to (13), wherein the alignment error is determined by a recording position error of the code against the recording medium positioning section.

Namely, a minimum non-interference area can be provided by estimating an alignment error based on a recording position error of the code against the recording medium positioning section.

(18) The medium according to (12), wherein a data recording medium is read by a code reader in which the code detection section starts detection processing from a specified position in the code detection area and terminates detection processing when detecting part of the code, and the non-interference area is widened on an upper or lower side of the code for the code detection section to start detection.

Namely, there is a possibility of code detection around the code on a side where the code detection section starts detection. When part of the code is detected, the detection processing terminates. Accordingly, no code detection is performed around the code on a side where the detection terminates. The recording surface of the recording medium can be used effectively by narrowing the non-interference area in the side where the detection terminates.

(19) The medium according to (12), wherein the code comprises a plurality of blocks, and each of the blocks comprises an arrangement of a data area containing data divided from the data, a marker area containing a marker for identifying that block, and a block ID area containing block ID information for independently identifying that block, according to a specified positional relationship.

Namely, the code is divided into blocks and is recorded in units of blocks. The reader performs a read operation in units of blocks. A large amount of data can be recorded as a code.

(20) The medium according to (19), wherein the data recording medium is read by a code reader which reads the code by means of relative scanning with reference to the image pickup section and provides the code detection section with a narrower code detection area used to detect the latter part of the code than a code detection area used to detect the beginning of the code during the scanning, and the non-interference area is narrowed in a portion other than an edge used to start scanning the code.

Once part of the code is detected in the code detection section, the code detection area can be narrowed because the guide section specifies a code pickup position in the image pickup screen during later detection processing. Accordingly, the non-interference area can be narrowed in a portion other than an edge to start scanning the code. The recording surface of the recording medium can be used effectively.

(21) A data recording medium comprising:

a portion where data is recorded as an optically readable code; and the other portion, wherein the recording medium stores the code read by a code reader having an image pickup section to pick up a code, an image detection section to detect a specified (known) image from an image pickup screen obtained in the image pickup section, and a restoration section to specify the code from the image pickup screen based on a detection position of the specified image detected in the image detection section and to restore data recorded in the code, and the specified image is provided near the code on a data recording medium and is positioned according to a specified (known) positional relationship with the code.

A specified image is recorded according to a specified positional relationship with the code. Accordingly, detecting that image in the image detection section can specify a position of the code based on the known positional relationship. It becomes possible to make code reading easy. When the positional relationship with the code is known, reading the code is not prevented even if a specified image is provided near the code, therefore, data can be reproduced reliably. It is possible to expand the possibility of card layout, e.g., by adding marks near the code and effectively use the recording surface.

(22) The medium according to (21), wherein the specified image is part of an adjacent code.

Namely, it is possible to successfully read the code and arrange other codes nearby. Accordingly, the recording surface can be used effectively.

(23) A card-shaped data recording medium comprising:

a portion which records visually readable images such as a character, symbol, figure, pattern, photo, etc.; and a portion which records data as an optically readable code along a given cut side, wherein a non-interference area is provided around the code to inhibit presence of only an interference image, out of the visually readable images, having an attribute causing an error during reading of the code, and the non-interference area contains a longer width (blank length) between the code and the cut side than a width (blank length) between the code and the visually readable image arranged adjacently to the code.

Since the card is provided with a large blank area void of other images to be recorded on the cut side, a smaller blank area can be provided on the opposite side. This can expand the possibility of card design.

Additional advantages and modifications will readily occur to those skilled in the art. Therefore, the invention in its broader aspects is not limited to the specific details, and representative devices shown and described herein.

Accordingly, various modifications may be made without departing from the spirit or scope of the general inventive concept as defined by the appended claims and their equivalents.

What is claimed is:

1. A code reader to read a code from a card-shaped data recording medium on which data is recorded as an optically readable code, said code reader comprising:

an image pickup section configured to pick up the code;

a slit guide section configured to specify a positional relationship between the image pickup section and the code, and to serve as a guide for the card-shaped data recording medium when the recording medium is inserted into the slit guide section and moved in a side direction;

a code detection section configured to set a code detection area in an image pickup screen obtained by the image pickup section, and to detect at least part of the code from inside of the code detection area; and a restoration section configured to specify the code from the image pickup screen based on a detection position of said at least part of the code detected by the code detection section, and to restore the data recorded in the code;

wherein the code detection section sets a second code detection area used to detect a latter part of the code that is narrower than a first code detection area used to detect a beginning part of the code as the recording medium is moved.

2. The code reader according to claim 1, wherein:

a non-interference area to prevent presence of only an interference image having an attribute causing an error during reading of the code is set to be wider on one of an upper side and a lower side of the code than on the other of the upper side and lower side of the code; and the code detection section starts detection of the code from the wider side of the non-interference area.

3. The code reader according to claim 1, wherein:

the code comprises a plurality of blocks;

each of the blocks comprises:

a data area containing data pieces obtained by dividing the data recorded in the code;

a marker region containing a marker for identifying the blocks; and a block ID area containing block ID information for independently identifying the blocks;

the data area, the marker region and the block ID area are arranged according to a specified position relationship;

said at least part of the code detected by the code detection section is the marker; and the restoration section specifies the code from the image pick up screen in units of blocks and restores the divided data pieces.

* * * * *